US 6,493,340 B1

(12) United States Patent
Kawanaka

(10) Patent No.: US 6,493,340 B1
(45) Date of Patent: Dec. 10, 2002

(54) AUTOMATIC NETWORK-ADDRESS-DUPLICATION DETECTION METHOD AND DEVICE

(75) Inventor: Masataka Kawanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/161,733

(22) Filed: Sep. 29, 1998

(30) Foreign Application Priority Data

Sep. 29, 1997 (JP) .............................................. 9-281347

(51) Int. Cl.[7] .......................... H04L 12/28; H04L 12/56
(52) U.S. Cl. ....................................... 370/392; 370/389
(58) Field of Search ................................ 370/392, 389, 370/394, 396, 399, 395.3, 395.31, 409, 471, 474, 475; 714/701, 702, 718, 719, 743, 768

(56) References Cited

U.S. PATENT DOCUMENTS

| 5,491,692 A | * | 2/1996 | Gunner et al. ............... 370/402 |
| 5,724,510 A | * | 3/1998 | Arndt et al. ................. 709/220 |
| 5,856,972 A | * | 1/1999 | Riley et al. .................. 370/389 |
| 6,151,319 A | * | 11/2000 | Dommety et al. ..... 370/395.52 |

FOREIGN PATENT DOCUMENTS

| JP | 3-212038 | 9/1991 |
| JP | 3-267845 | 11/1991 |
| JP | H6-75900 | 3/1994 |
| JP | H6-268650 | 9/1994 |
| JP | H7-240751 | 9/1995 |
| JP | H7-273834 | 10/1995 |
| JP | H9-252316 | 9/1997 |

* cited by examiner

Primary Examiner—Douglas Olms
Assistant Examiner—Phirin Sam
(74) Attorney, Agent, or Firm—Foley & Lardner

(57) ABSTRACT

The present invention provides an automatic network-address-duplication detection method and an automatic network-address-duplication detection device which detect a duplication in two or more network addresses assigned to interconnected data transmission units on a network. A network layer communication controller in a data transmission unit, which runs under control of the link state routing protocol, has a MAC address acquisition circuit, which obtains the MAC address of the data transmission unit, stores the obtained MAC address into a link state packet, and sends the link state packet to the network. Upon receiving the link state packet from some other data transmission unit, the network layer communication controller obtains the system identification and the MAC address from the received link state packet, searches an NSAP-MAC address table for the obtained system identification and, if the same system identification is found, compares the MAC address obtained from the link state packet of the sending data transmission unit with the MAC address corresponding to the system identification that is found in the NSAP-MAC address table. If the two MAC addresses do not match, it is determined that the NSAP address is duplicated.

22 Claims, 10 Drawing Sheets

FIG.10

| | 100 SUBSCRIBER'S ADDRESS | 101 MAC ADDRESS (TERMINAL'S MAC ADDRESS CONTAINED IN TERMINAL INITIAL PACKET) |
|---|---|---|
| 1 | SUBSCRIBER'S ADDRESS | MAC ADDRESS (TERMINAL'S MAC ADDRESS CONTAINED IN TERMINAL INITIAL PACKET) |
| 2 | SUBSCRIBER'S ADDRESS | MAC ADDRESS (TERMINAL'S MAC ADDRESS CONTAINED IN TERMINAL INITIAL PACKET) |
| 3 | SUBSCRIBER'S ADDRESS | MAC ADDRESS (TERMINAL'S MAC ADDRESS CONTAINED IN TERMINAL INITIAL PACKET) |
| 4 | SUBSCRIBER'S ADDRESS | MAC ADDRESS (TERMINAL'S MAC ADDRESS CONTAINED IN TERMINAL INITIAL PACKET) |
| 5 | SUBSCRIBER'S ADDRESS | MAC ADDRESS (TERMINAL'S MAC ADDRESS CONTAINED IN TERMINAL INITIAL PACKET) |
| ⋯ | ⋯ | ⋯ |
| n | SUBSCRIBER'S ADDRESS | MAC ADDRESS (TERMINAL'S MAC ADDRESS CONTAINED IN TERMINAL INITIAL PACKET) |

AUTOMATIC NETWORK-ADDRESS-DUPLICATION DETECTION METHOD AND DEVICE

BACKGROUND OF THE INVENTION

1. Field of the Invention

The present invention relates to a method and a device for automatically detecting a data transmission unit with a duplicated network address, and more particularly to a method and a device for automatically detecting a data transmission unit with a duplicated address on a network under control of link state routing.

2. Description of the Related Art

Conventionally, this type of address duplication detection system has been used for detecting the duplicated address of a data transmission unit on a local area network (LAN). An earlier patent disclosure dealing with this is found in Japanese Patent Publication (unexamined) No. A-3-212038.

FIG. 8 shows an example of the configuration of a LAN system using a conventional address duplication detection system.

FIG. 9 shows the format of a terminal initial packet. This terminal initial packet is sent either by a LAN terminal 28 in the LAN system shown in FIG. 8 when it starts sending packets or by a terminal adapter 29 when it detects that a line terminal 30 connected to it starts sending packets. The terminal initial packet is composed of the destination Media Access Control (MAC) address, the MAC address of the terminal, and the subscriber's address.

FIG. 10 shows an address table stored in a network monitoring unit 26. When the terminal initial packet is received, the system searches the address table for a match. If the subscriber's address in the terminal initial packet is not found in the table, the pair of the subscriber's address and the MAC address is added to the table.

Now, assume that a LAN terminal 35 is added to the LAN system, shown in FIG. 8, with its subscriber's address mistakenly set to the address of a line terminal 34, one of the existing terminals. The following describes how the conventional address duplication detection system works in this situation. In the following description, the subscriber's address of the LAN terminal 35 is AAAA, its MAC address is 111111111111, the subscriber's address of the line terminal 34 is AAAA, and the MAC address of the terminal adapter 29 is 222222222222.

When the line terminal 34 starts operation, the modem interface signal is activated and sent to the terminal adapter 29. Upon receiving this signal, the terminal adapter 29 sends the terminal initial packet in the format shown in FIG. 9 to the network monitoring unit 26 via the transmission line. In this case, the terminal initial packet contains the MAC address of 222222222222 and the subscriber's address of AAAA.

Upon receiving the terminal initial packet, the network monitoring unit 26 checks if the subscriber's address is already in the address table and if the MAC address stored in the address table matches the MAC address of the received terminal initial packet. In this case, the network monitoring unit 26 finds that the both are satisfied and then ends duplication checking. If the subscriber's address is not stored in the address table, the network monitoring unit 26 adds the pair of the subscriber's address and the MAC address to the address table.

On the other hand, when the LAN terminal 35 starts operation, it sends a terminal initial packet containing the MAC address of 111111111111 and the subscriber's address of AAAA to the network monitoring unit 26. Upon receiving this terminal initial packet, the network monitoring unit 26 finds that the subscriber's address is already in the address table but that the MAC address stored in the address table does not match the MAC address contained in the received terminal initial packet. That is, the network monitoring unit 26 detects a subscriber's address duplication.

The automatic address-duplication detection device disclosed in Japanese Patent Publication (unexamined) No. A-3-267845 is used on a ring LAN and in a data transmission unit connected to the ring LAN. To detect address duplications, this device uses two types of node address for each data transmission unit: a node address which is unique and is usually set in the unit and a test node address which is specifically prepared for testing and which does not duplicate with the node address. First, the device in the data transmission unit sends onto the ring LAN a line loopback frame containing the unique node addresses as the destination node address and as the sending node address. If the loopback frame is not sent back to the sending data transmission unit, then the device sends onto the ring LAN a line loopback frame containing the test node address as the destination node address and as the sending node address. If the frame is sent back to the sending transmission unit, then the device finds that a transmission unit with the node address of the sending transmission unit is on the network.

The systems and device according to the prior art have the following problems. The first problem is that, when a commercially-available router not compatible with the system disclosed in Japanese Patent Publication (unexamined) No. A-3-212038 is used to connect LANs, a remote LANs also requires a network monitoring unit in order to detect address duplications. The second problem with this system is that, if a network monitoring unit fails due to a power failure or an operation error, address duplications cannot be detected.

The problem with Japanese Patent Publication No. A-3-267845 is that the device detects a duplication only in the termination (or sending) unit but not in intermediate systems (routers).

SUMMARY OF THE INVENTION

It is an object of this invention to provide a method for automatically detecting a network address duplication in network addresses assigned to data transmission units (intermediate systems) which are installed not only in one LAN but also on a point-to-point line or in the interconnected networks connected via WAN (Wide Area Network). In particular, it is an object of this invention to provide a method for detecting an address duplication in a network under control of link state routing.

Accordingly, the present invention is an automatic network-address-duplication detection method for detecting duplicated addresses among a plurality of networked data transmission units under control of link state routing. On one data transmission unit, this automatic network-address-duplication detection method comprises the steps of transmitting a network-wide distribution packet, the transmission comprising the steps of (i) obtaining an address assigned to the one data transmission unit in the network; (ii) reading identification information on the one data transmission unit; adding the obtained address and the identification information to the network-wide distribution packet; and (iv) transmitting the network-wide distribution packet to the network. On another data transmission unit, this automatic networkaddress-duplication detection method comprises the steps of checking the network-wide distribution packet, the checking step comprising the steps of (i) receiving the network-wide distribution packet;(ii) extracting the identification information and the address of the sending data transmission unit from the received packet; (iii) searching a previously-prepared table for a pair of the identification information and the address of the sending data transmission unit, the table containing a plurality of pairs of the identification information and the address; and(iv) comparing the address contained in the received packet with the address corresponding to other identification information in the table.

The automatic network-address-duplication detection method according to this invention allows an NSAP address duplication to be detected simply by connecting a data transmission unit using the method of this invention to a console terminal for a predetermined period of time. Once the data transmission unit is connected, it sends the LSP containing a unique MAC address to the network at a regular interval and the other data transmission units, upon receiving the LSP, check the received LSP for an address duplication.

Furthermore, the automatic network-address-duplication detection method according to this invention detects duplicated network addresses even if the network contains data transmission units not using the method of this invention. This is because the LSP, which is always distributed to other data transmission units under control of link state routing, contains an MAC address.

The automatic network-address-duplication detection method according to this invention functions even when the network contains a WAN.

BRIEF DESCRIPTION OF THE DRAWINGS

FIG. 10 is a schematic diagram showing the address table used in the conventional address duplication detection system.

DESCRIPTION OF THE PREFERRED EMBODIMENTS

Some embodiments of the present invention are described below in detail with reference to the drawings.

Figure 1:
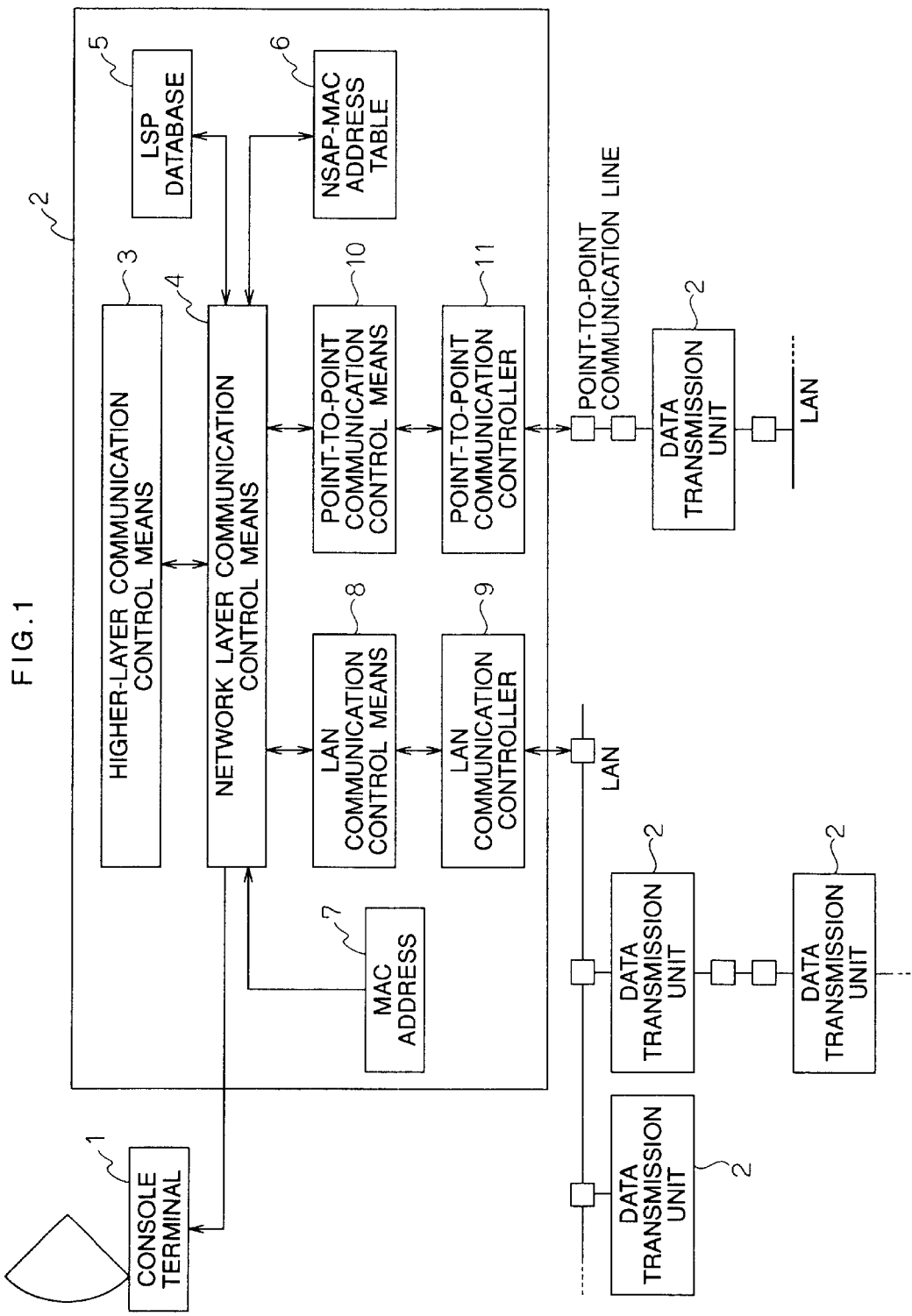
FIG. 1 is a block diagram showing the configuration of a network system and a plurality of data transmission units employing the automatic network-address-duplication detection method used in a first embodiment of the present invention.

FIG. 1 is a block diagram showing the configuration of a network system in which the automatic network-address duplication detection method used in a first embodiment of the present invention is employed. This network comprises a plurality of data transmission units 2, interconnected with each other via a LAN or a point-to-point line, and a console terminal 1 connected to each data transmission unit 2.

The data transmission unit 2 is an intermediate system with the functions compatible to those corresponding to the seven layers, 1 to 7, of the Open System Interconnection (OSI) reference model. It comprises higher-layer communication control means 3, network layer communication control means 4, an LSP database 5, an NSAP-MAC address table 6, a MAC address 7, a LAN communication control means 8, a LAN communication controller 9, a point-to-point communication control means 10, and a point-to-point communication controller 11.

The higher-layer communication control means 3 performs the functions corresponding to layers 4–7 of the OSI reference model. The network layer communication control means 4 performs the function corresponding to layer 3 of the OSI reference model. It uses a route state control routing system as the routing protocol. The LSP database 5 contains the LSPs used in route state control routing. The NSAP-MAC address table 6 contains a plurality of pairs each composed of the MAC address of the data transmission unit 2 and a system ID. The MAC address 7 is the unique physical address of the data transmission unit 2. This address is assigned by the manufacturer. The LAN communication control means 8 performs the function corresponding to layer 2 of the OSI reference model for LAN communication, and the LAN communication controller 9 performs the function corresponding to layer 1 for LAN communication. The point-to-point communication control means 10 performs the function corresponding to layer 2 for communication over a point-to-point communication, and the point-to-point communication controller 11 performs the function corresponding to layer 1.

Figure 2:
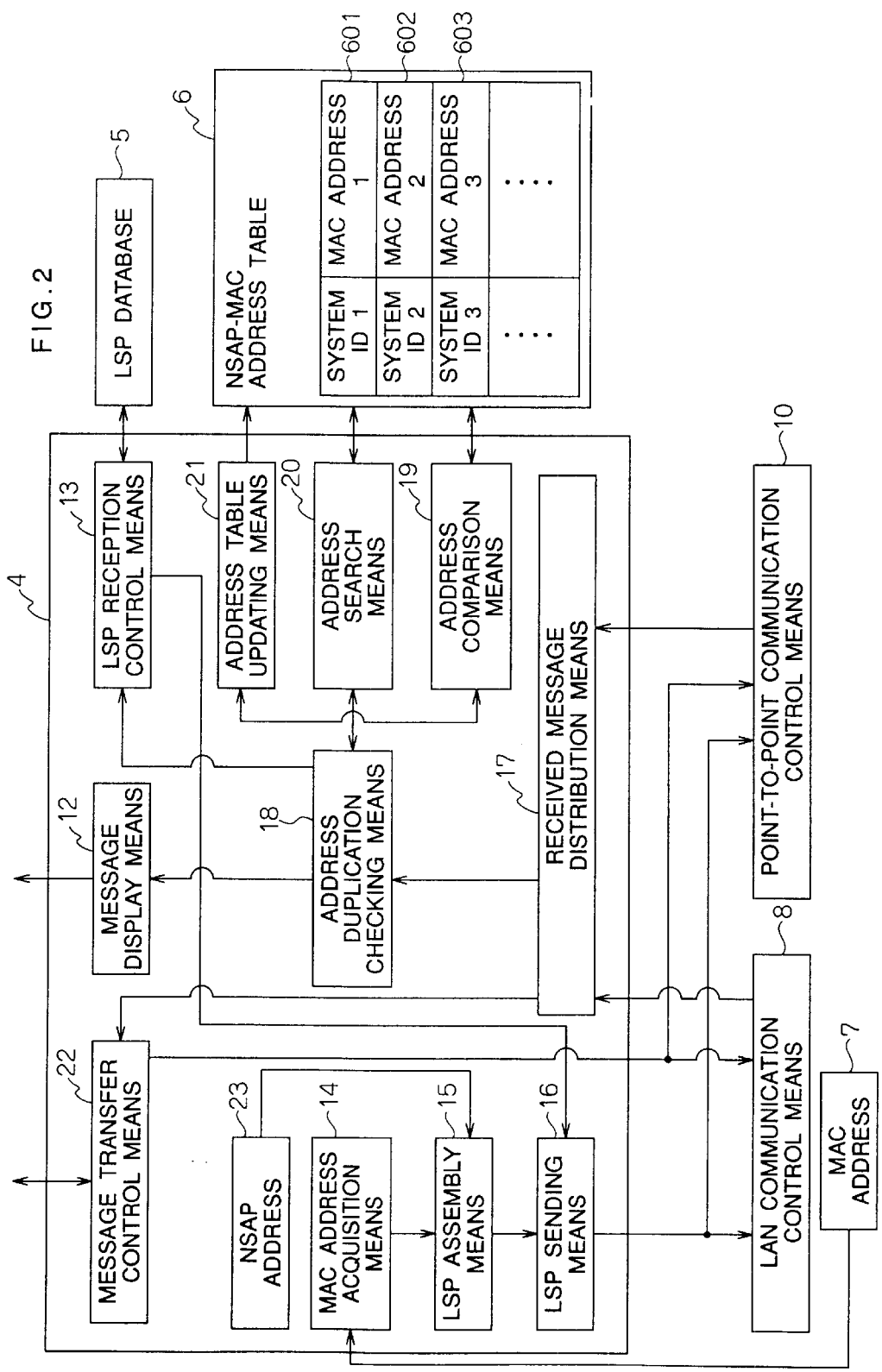
FIG. 2 is a diagram showing the configuration of the network layer communication control means shown in FIG. 1.

As shown in FIG. 2, the network layer communication control means 4 comprises message display means 12, LSP reception control means 13, MAC address acquisition means 14, LSP assembly means 15, LSP sending means 16, received message distribution means 17, address duplication checking means 18, address comparison means 19, address search means 20, address table updating means 21, message transfer control means 22, and an NSAP address 23.

Figure 3:
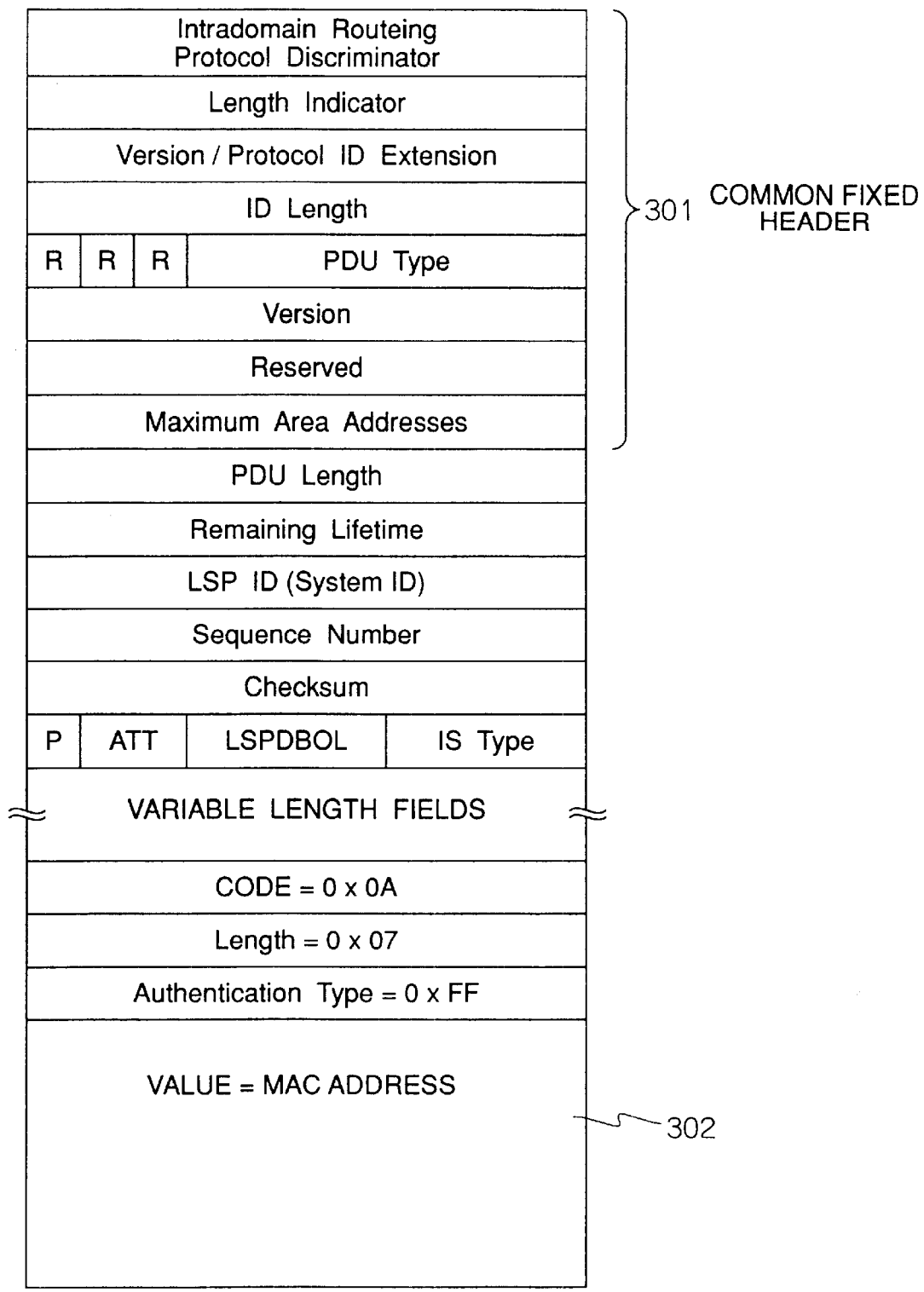
FIG. 3 is a diagram showing the configuration of an LSP sent from the LSP sending means shown in FIG. 2.

FIG. 3 is a diagram showing the format of an LSP. The LSP is divided roughly into two areas: a common fixed header area and a non-header area. The common fixed header is composed of a protocol ID (Intradomain Routing Protocol Discriminator) field, a header length (Length Indicator) field, a version (Version/Protocol ID Extension) field, an ID length (ID Length) field, a packet type (PDU Type) field, a version field, a reserved field, and a maximum number of area addressees(Maximum Area Addresses) field. The non-header area is composed of a packet length (PDU Length) field, a remaining time (Remaining Lifetime) field, an LSP ID (including part of system ID) field, a sequence number field, a checksum field, a break repair support flag (P), a flag (ATT) field, an LSPDBOL field, an IS type field, a plurality of variable-length fields, a code (CODE=0x0A) field, a length (Length=0x07) field, an authentication type (Authentication Type=0xFF) field, and an option (Value= MAC address) field.

Figure 4:
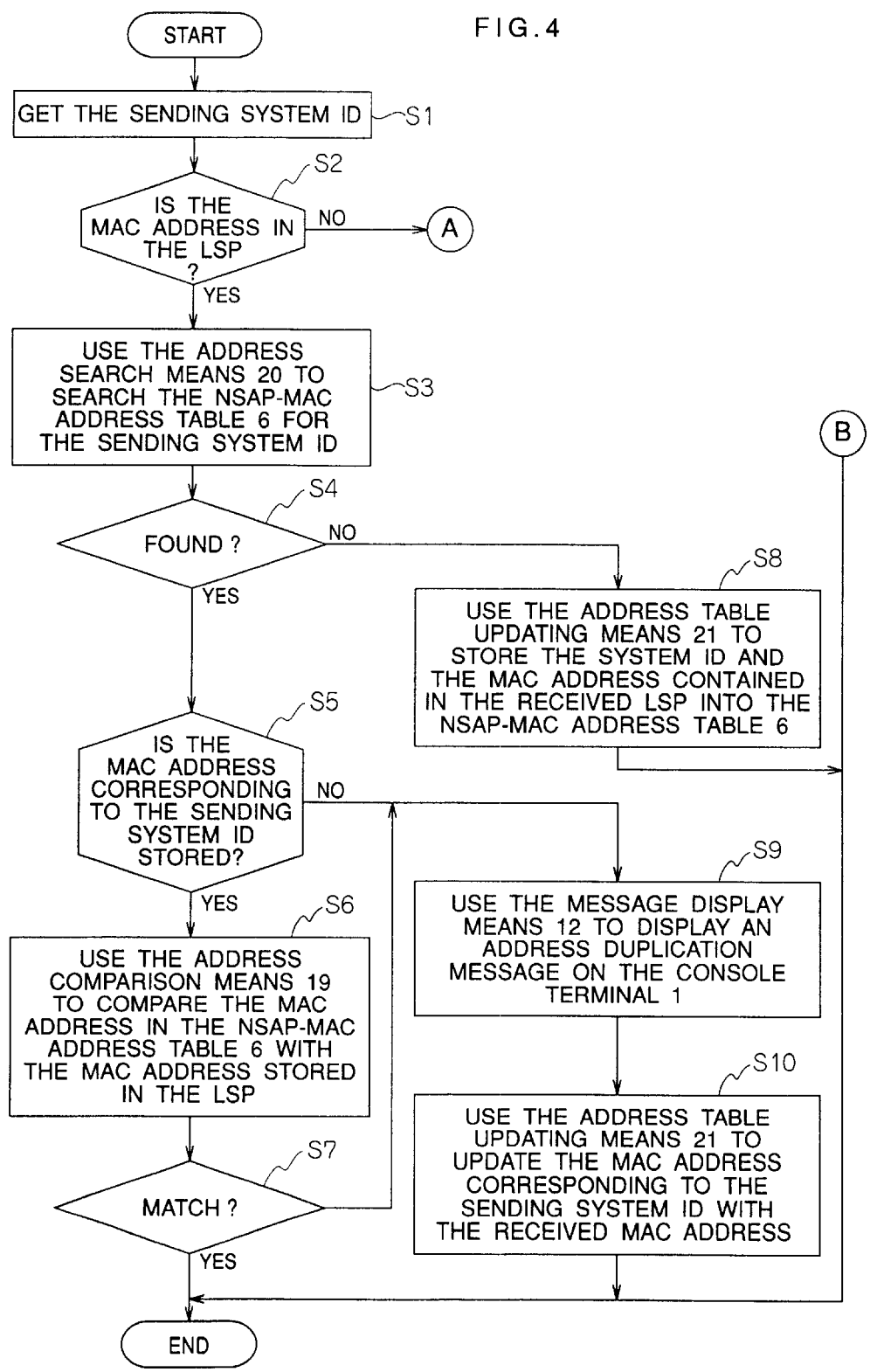
FIG. 4 is a flowchart showing the processing of the address duplication checking means shown in FIG. 2.
Figure 5:
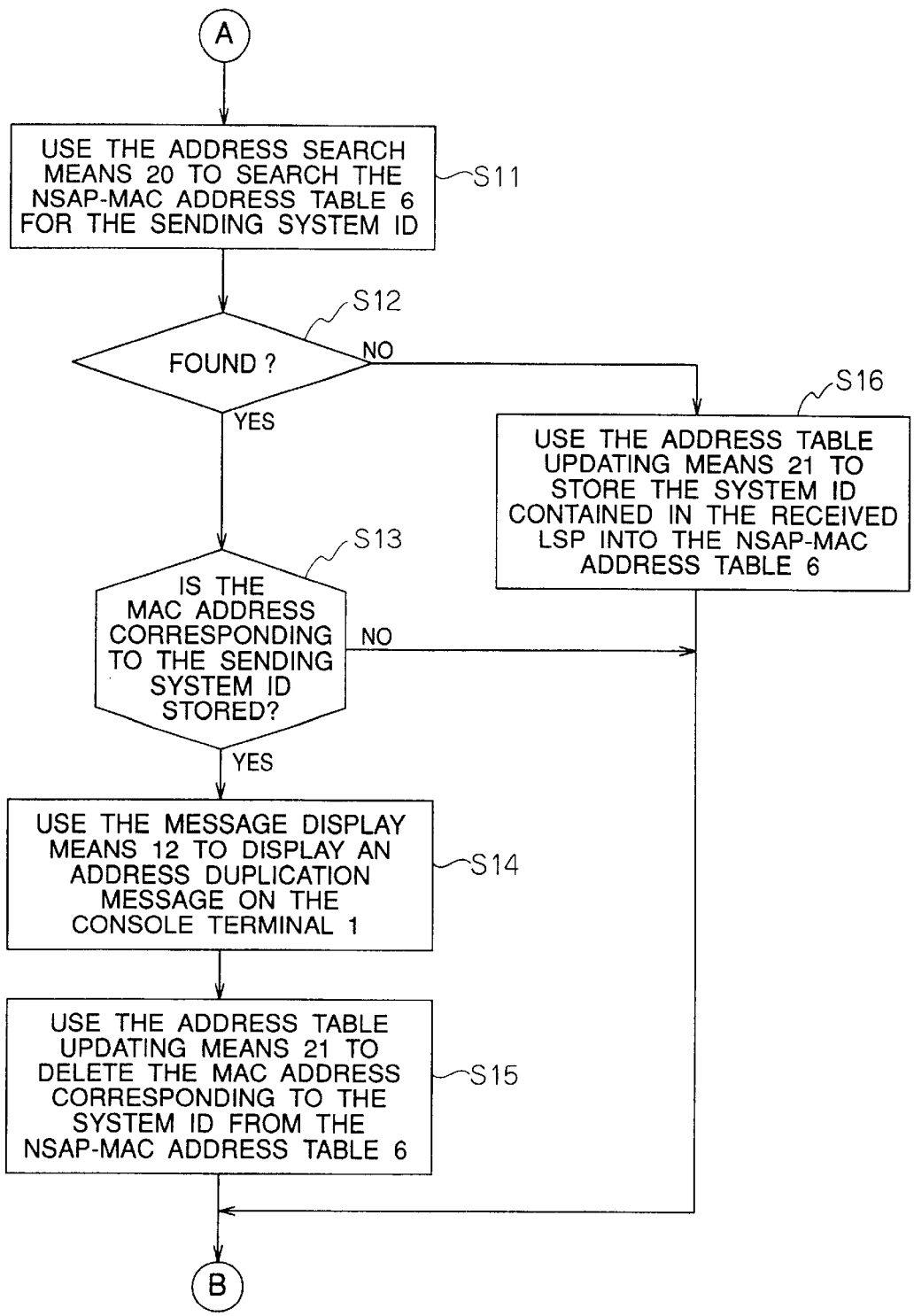
FIG. 5 is a flowchart showing the processing of the address duplication checking means shown in FIG. 2.

FIGS. 4 and 5 are the flowcharts showing the processing of the address duplication checking means 18. As shown in FIGS. 4 and 5, the processing of the address duplication checking means 18 is composed of a step for acquiring a sending system ID (step S1), a step for checking if an MAC address is included in the LSP (step S2), a step for searching the NSAP-MAC address table for the sending system ID (step S3), a step for checking if the search is successful (step S4), a step for checking if the MAC address is stored in the NSAP-MAC table (step S5), a step for comparing the MAC address in the LSP with the MAC address in the NSAP-MAC table (step S6), a step for checking if the MAC addresses match (step S7), a step for updating the NSAP-MAC address table (step S8), a step for displaying an address duplication message (step S9), a step for updating the NSAP-MAC address table (step S10), a step for searching the NSAP-MAC address table for the sending system ID (step S11), a step for checking if the search is successful (step S12), a step for checking if the MAC address is stored in the NSAP-MAC address table (step S13), a step for displaying the address duplication message (step S14), a step for updating the NSAP-MAC address table (step S15), and a step for updating the NSAP-MAC address table (step S16).

Next, the operation of the duplicated network-address automatic detection method according to the first embodiment of this invention is described with reference to FIGS. 1, 2, 3, 4, and 5.

First, the LSP for use in the present invention is generated and transmitted as follows:

Each data transmission unit 2 on the network generates its own LSP at a regular interval to perform link state routing and sends it to all the other transmission units on the network. When generating the LSP, the data transmission unit 2 uses the MAC address acquisition means 14 to acquire the unique MAC address 7 assigned to the data transmission unit 2 and passes the acquired MAC address 7 to the LSP assembly means 15. The LSP assembly means 15 adds the MAC address to the option field at the end of the generated LSP, as shown in FIG. 3. The LSP assembly means 15 also gets the system ID from the NSAP address 23 of the transmission unit and stores the system ID in the LSP ID field. The LSP sending means 16 sends the LSP generated by the LSP assembly means 15 to the network. This way, the LSP is distributed to all data transmission units 2 on the network.

The automatic network-address-duplication detection system according to the present invention is characterized in that the MAC address 7 of the data transmission unit 2 is inserted into the LSP to be distributed to the network. In the link state routing protocol, there are many fixed-format messages other than the LSP, but only the LSP is distributed to all the data transmission units on the network. In addition, because the LSP is distributed to the network using an algorithm independent of the link state routing algorithm, it is not affected even if there are two or more data transmission units 2 with duplicated network addresses. Therefore, the MAC address of the data transmission unit 2 inserted into the LSP is always distributed to all the other data transmission units 2 on the network.

Next, the LSP is used for detecting an address duplication as follows:

Upon receiving the LSP, each data transmission unit 2 on the network performs the following. First, the received message distribution means 17 finds the LSP and informs the address duplication checking means 18 that the LSP has been received. The address duplication checking means 18 gets the sending system ID from the LSP ID field of the received LSP (step S1), and checks if the MAC address of the sending data transmission unit 2 is included in the received LSP (step S2). If the address duplication checking means 18 finds the MAC address in the LSP, it passes control to step S3.

If the address duplication checking means 18 does not find the MAC address in the LSP, it asks the address search means 20 to search the NSAP-MAC address table 6 for the sending system ID, assuming that the LSP was sent from the data transmission unit 2 not having the duplicated network-address detection system according to the present invention (step S11). If the address search means 20 does not find the system ID in the NSAP-MAC address table 6, the address duplication checking means 18 assumes that the LSP is a new LSP (step S12) and asks the address table updating means 21 to add the sending system ID to the NSAP-MAC address table 6 (step S16). In this case, the address table updating means 21 adds the MAC address of "000000000000" (an unknown address indicator indicating an unknown MAC address) to the NSAP-MAC address table 6 to indicate that the MAC address is unknown. The address duplication checking means 18 then ends address duplication checking. If, as a result of step S11, the address search means 20 finds the sending system ID in the NSAP-MAC address table 6 (Yes in step S12), the address duplication checking means 18 checks if the corresponding MAC address is stored in the table (step S13) and, if not, ends processing. If the address duplication checking means 18 finds a corresponding MAC address in the table, it determines that the address is duplicated because the received LSP should not have a MAC address. In this case, the address duplication checking means 18 asks the message display means 12 to display an address duplication message on the console terminal 1 (Step S14), and then asks the address table updating means 21 to delete only the corresponding MAC address from the NSAP-MAC address table 6 (step S15) before ending address duplication checking.

If, as a result of step S2, the address duplication checking means 18 finds that the MAC address is stored in the LSP, it asks the address search means 20 to search the NSAP-MAC address table 6 for the sending system ID obtained from the LSP (step S3). If, as a result of the search, the address search means 20 does not find the system ID in the NSAP-MAC address table 6 (No in step S4), the address duplication checking means 18 asks the address table updating means 21 to add a pair of the system ID and the MAC address, obtained from the received LSP, to the NSAP-MAC address table 6 (step S8) and ends processing. If the address search means 20 finds the system ID in the NSAP-MAC address table 6 (Yes in step S4), the address duplication checking means 18 asks the address search means 20 to check if the MAC address corresponding to the system ID is stored in the NSAP-MAC address table 6 (step S5). If the address search means 20 does not find a corresponding MAC address in the NSAP-MAC address table 6, the address duplication checking means 18 asks the message display means 12 to display an address duplication message on the console terminal 1 (step S9), asks the address table updating means 21 to add the MAC address corresponding to the sending system ID to the NSAP-MAC address table 6 (step S10), and ends address duplication checking. If the address search means 20 finds the MAC address in the NSAP-MAC address table 6, the address duplication checking means 18 asks the address comparison means 19 to compare the MAC address stored in the NSAP-MAC address table 6 with the MAC address stored in the received LSP (step S6). If the two MAC addresses do not match (No in step S7), the address duplication checking means 18 asks the message display means 12 to display the address duplication message on the console terminal 1 (step S9), asks the address table updating means 21 to replace the MAC address stored in the NSAP-MAC address table 6 with the received MAC address (step S10), and ends address duplication checking.

Next, a second embodiment of the present invention is described in detail with reference to FIGS. 6 and 7.

Figure 6:
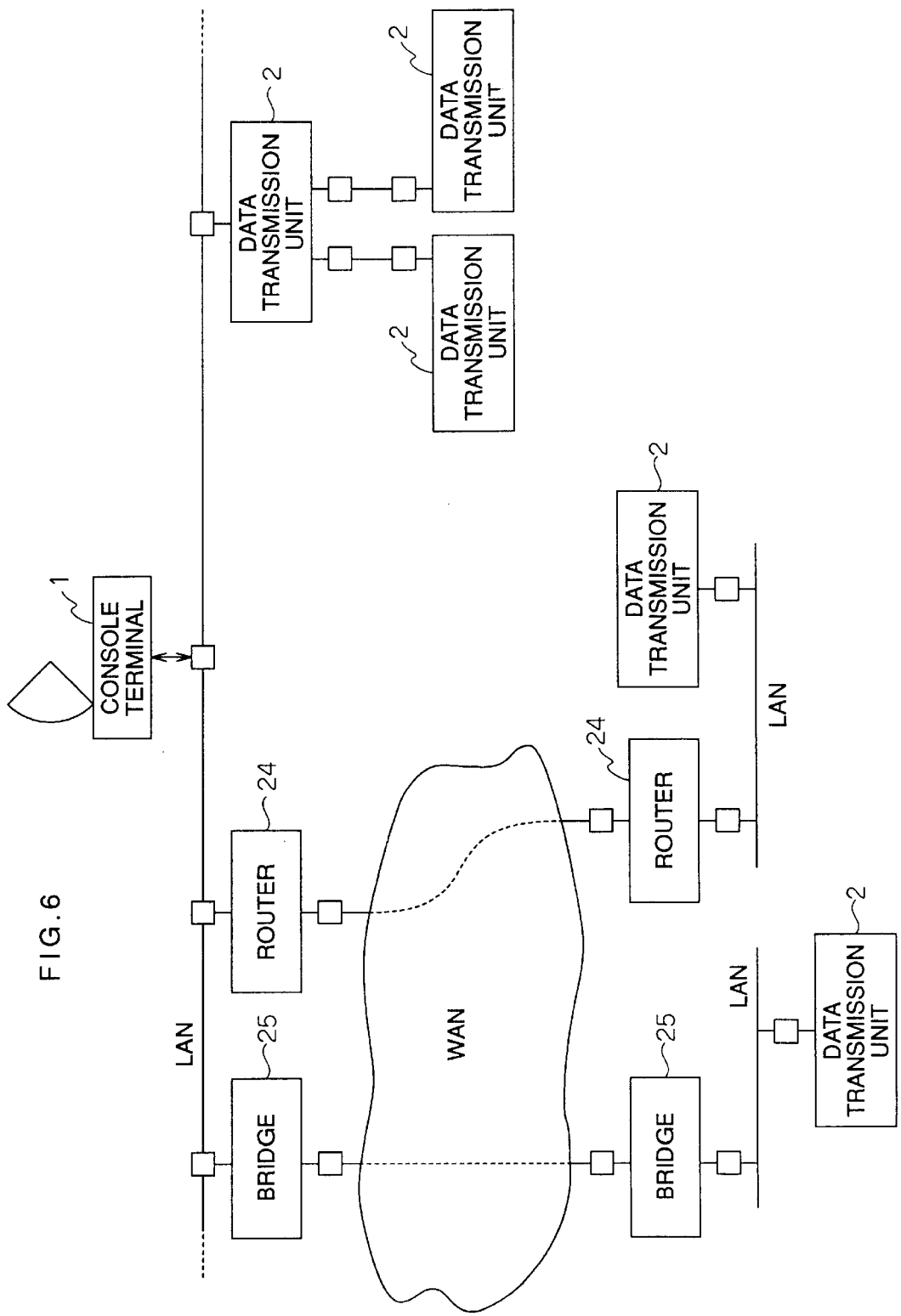
FIG. 6 is a block diagram showing a network system employing the automatic network-address-duplication detection system used in a second embodiment of the present invention.

FIG. 6 shows a network system employing a automatic network-address-duplication detection system used in the second embodiment. The configuration of this network system differs from that of the network system employing the duplicated network-address detection system of the first embodiment in that some data transmission units 2 are connected to a WAN via a router 24 or a bridge 25. The method used in the first embodiment may also used in detecting duplicated network addresses in the second embodiment.

Figure 7:
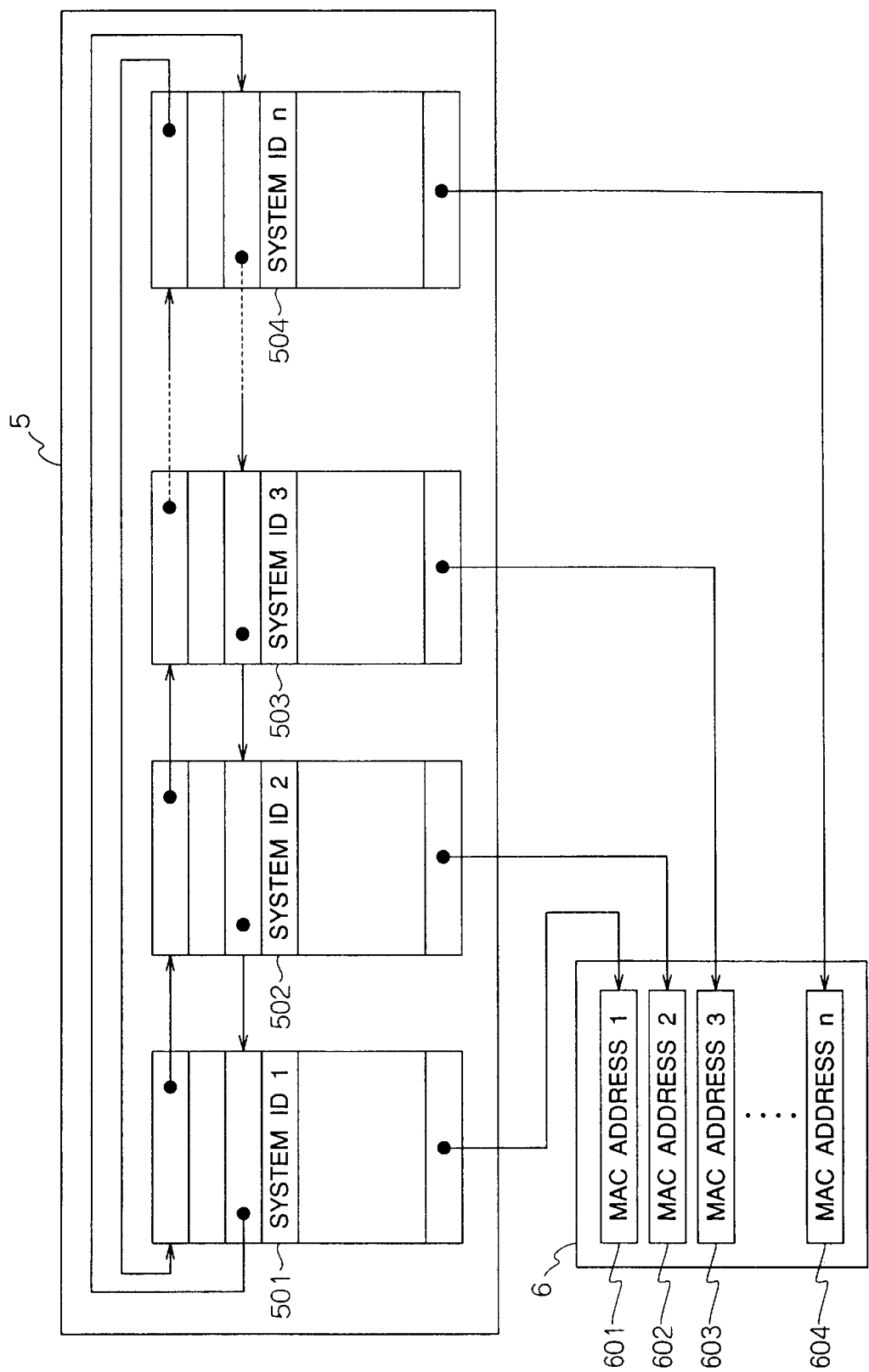
FIG. 7 is a diagram showing the configuration of an LSP database and an NSAP-MAC address table used in the automatic network-address-duplication detection system of the second embodiment.
Figure 8:
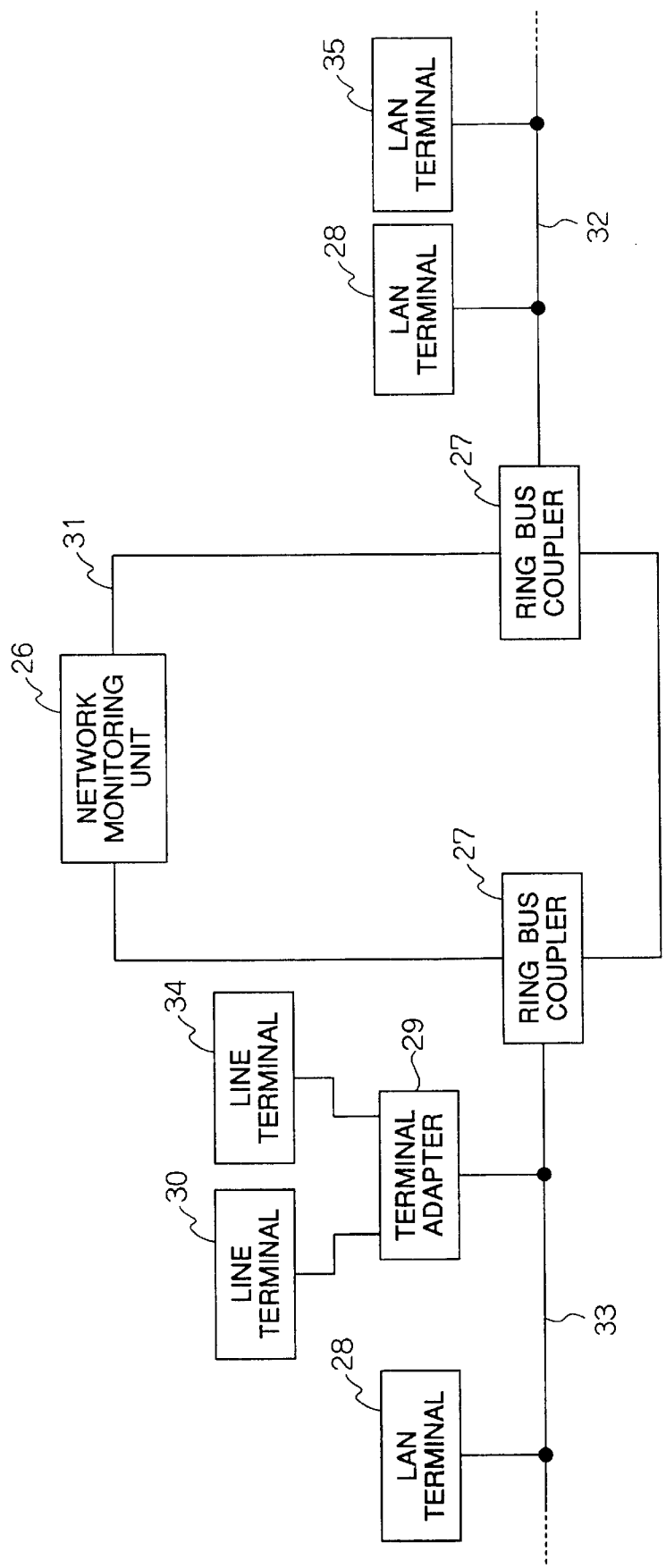
FIG. 8 is a block diagram showing a network system using the conventional address duplication detection system.
Figure 9:
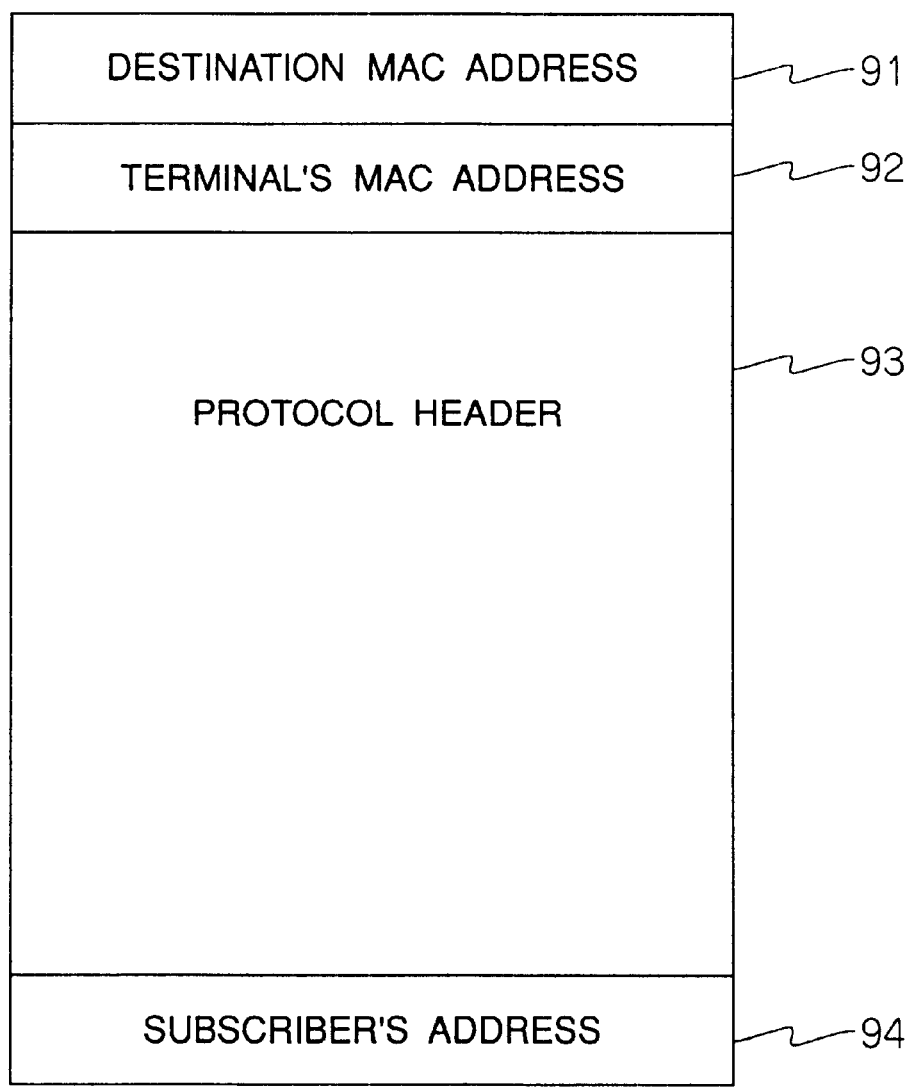
FIG. 9 is a schematic diagram showing the format of a terminal initial packet used in the conventional address duplication detection system.

FIG. 7 shows the LSP database 5 and the NSAP-MAC address table 6 used in the second embodiment of the automatic network-address-duplication detection system according to the present invention. The first embodiment and the second embodiment differ only in that the NSAP-MAC address table 6 used in the second embodiment contains only the MAC addresses obtained from the LSPs and in that the LSP of each data transmission unit 2 stored in the LSP database 5 contains a pointer pointing to the corresponding MAC address in the NSAP-MAC address table 6. In this configuration, the address search means 20 searches the LSP database 5, rather than the NSAP-MAC address table 6, for the MAC address corresponding to the system ID. Of course, the automatic network-address-duplication detection method used in the second embodiment provides the same advantage as that provided by the method used in the first embodiment.

Next, an example of operation of the duplication network-address detection method used in the first embodiment is described in detail with reference to FIGS. 1, 2, 3, 4, and 5.

Assume that data transmission unit A with the NSAP address of 4900000000000101 and the MAC address of 00004C4B0001, data transmission unit B with the NSAP address of 4900000000000201 and the MAC address of 00004C4B0002, and data transmission unit C with the NSAP address of 4900000000000301 and the MAC address of 00004C4B0003 are connected to the network. Also assume that the automatic network-address-duplication detection device according to the present invention is installed on data transmission units A and B but not on data transmission system C.

In this network, when each of data transmission units A, B, and C generates the LSP of its own at least once for every three minutes for transmission to the network, the NSAP-MAC address table 6 of each of data transmission units A, B, and C contains three entries composed of (system ID, MAC address) in at least three minutes after it is started: (000000000001, 00004C4B0001), (000000000002, 00004C4B0002), and (000000000003, 00004C4B0003).

In this situation, data transmission unit D with the NSAP address of 4900000000000201 and the MAC address of 00004C4B0004 is added to the network. This transmission unit has the automatic network-address-duplication detection device according to the present invention. In this case, data transmission units A, B, and C operate as described below.

Upon receiving the LSP from data transmission unit D, each of the data transmission units A, B, and C gets the sending system ID of 000000000002 from the LSP (step S1). Because the LSP contains the MAC address (step S2), each data transmission unit searches the NSAP-MAC address table 6 for the sending system ID of 000000000002 (step 3) and gets an entry (000000000002, 00004C4B0002) from the table (step S4). Because the MAC address is contained in the entry (step S5), the data transmission unit compares the MAC address of 00004C4B0002 stored in the NSAP-MAC address table 6 with the MAC address of 00004C4B0004 obtained from the LSP (step S6). Because the two MAC address do not match (step S7), the data transmission unit displays the address duplication message on the console terminal 1, saying that the NSAP address with the system ID of 000000000002 is duplicated on the data transmission unit with the MAC address of 000000000002 and the data transmission unit with the MAC address of 000000000004 (step S9). The data transmission unit then replaces the entry (000000000002, 00004C4B0002) with (000000000002, 00004C4B0004) and ends processing.

The method according to the present invention updates the NSAP-MAC address table 6. Because the table is updated, the address duplication message is displayed only once, for example, when data transmission unit D is added, not as a new data transmission unit, but as a replacement for data transmission unit B which has failed. If the NSAP-MAC address table 6 is not updated, the message will be displayed repeatedly.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-281347 (Filed on Sep. 29th, 1997) including specification, claims, drawings and summary are incorporated herein by reference in its entirety.

What is claimed is:

1. An automatic network-address-duplication detection method for detecting duplicated addresses among a plurality of data transmission units on a network, said plurality of data transmission units being under control of link state routing, said automatic network-address-duplication detection method comprising the steps of:

(a) on one data transmission unit, transmitting a network-wide distribution packet, said transmitting step comprising the steps of:
(i) obtaining an address assigned to the one data transmission unit in the network;
(ii) reading identification information on the one data transmission unit;
(iii) adding the obtained address and the identification information to the network-wide distribution packet; and
(iv) transmitting the network-wide distribution packet to the network; and (b) on another data transmission unit, checking the network-wide distribution packet, said checking step comprising the steps of:
(i) receiving the network-wide distribution packet;
(ii) extracting the identification information and the address of the sending data transmission unit from the received packet;

(iii) searching a previously-prepared table for a pair of the identification information and the address of the sending data transmission unit, said table containing a plurality of pairs of the identification information and the address; and (iv) comparing the address contained in the received packet with the address corresponding to other identification information in the table.

2. The network-address-duplication detection method according to claim 1, wherein said step (b) further comprising the steps of:

(v) determining that there is an address duplication if the address in the received packet matches the address corresponding to some other identification information; and (vi) adding the pair of the address and the identification information of the sending data transmission unit to the table if said pair is not found in the table.

3. The network-address-duplication detection method according to claim 1, wherein said packet is a link state packet.

4. The network-address-duplication method according to claim 1, wherein said identification information is a system identification of said sending data transmission unit and said address is a media access control address.

5. The network-address-duplication detection method according to claim 2, wherein said packet is a link state packet.

6. The network-address-duplication method according to claim 2, wherein said identification information is a system identification of said sending data transmission unit and said address is a media access control address.

7. An automatic network-address-duplication detection device for detecting duplicated addresses among a plurality of data transmission units on a network, said plurality of data transmission units being under control of link state routing, said automatic network-address-duplication detection device in each of said plurality of data transmission units comprising an address assigned to the data transmission unit, identification information identifying the data transmission unit, a table containing a plurality of pairs of the address and the identification information, and a processor, wherein said processor causes said automatic network-address-duplication detection device to:

(a) transmit a network-wide distribution packet on one data transmission unit, wherein said processor causes said one data transmission unit to:

(i) obtains said address;

(ii) reads said identification information;

(iii) adds the obtained address and the identification information to the network-wide distribution packet; and (iv) transmits the network-wide distribution packet to the network; and (b) check the network-wide distribution packet on another data transmission unit, wherein said processor causes said another data transmission unit to:

(i) receives the network-wide distribution packet;

(ii) extracts the identification information and the address of the sending data transmission unit from the received packet;

(iii) searches the table for a pair of the identification information and the address of the sending data transmission unit; and (iv) compares the address contained in the received packet with the address corresponding to other identification information.

8. An automatic network-address-duplication detection device for detecting duplicated addresses among a plurality of data transmission units on a network, said plurality of data transmission units being under control of link state routing, said automatic network-address-duplication detection device comprising:

(a) on one data transmission unit, means for transmitting a network-wide distribution packet, said means for transmission comprising:

(i) means for obtaining an address assigned to the one data transmission unit in the network;

(ii) means for reading identification information on the one data transmission unit;

(iii) means for adding the obtained address and the identification information to the network-wide distribution packet; and (iv) means for transmitting the network-wide distribution packet to the network; and (b) on another data transmission unit, means for checking the network-wide distribution packet, said means for checking step comprising:

(i) means for receiving the network-wide distribution packet;

(ii) means for extracting the identification information and the address of the sending data transmission unit from the received packet;

(iii) means for searching a previously-prepared table for a pair of the identification information and the address of the sending data transmission unit, said table containing a plurality of pairs of the identification information and the address; and (iv) means for comparing the address contained in the received packet with the address corresponding to other identification information in the table.

9. A computer program product stored on a storage medium for controlling an automatic network-address-duplication detection device for detecting duplicated addresses among a plurality of data transmission units on a network, said plurality of data transmission units being under control of link state routing, wherein the program causes said automatic network-address-duplication detection device to:

(a) on one data transmission unit, transmit a network-wide distribution packet, wherein said one data transmission unit:

(i) obtains an address assigned to the one data transmission unit in the network;

(ii) reads identification information on the one data transmission unit;

(iii) adds the obtained address and the identification information to the network-wide distribution packet; and (iv) transmits the network-wide distribution packet to the network; and (b) on another data transmission unit, check the network-wide distribution packet, wherein said another data transmission unit:

(i) receives the network-wide distribution packet;

(ii) extracts the identification information and the address of the sending data transmission unit from the received packet;

(iii) searches a previously-prepared table for a pair of the identification information and the address of the sending data transmission unit, said table containing a plurality of pairs of the identification information and the address; and (iv) compares the address contained in the received packet with the address corresponding to other identification information in the table.

10. An automatic network-address-duplication detection method for detecting duplicated addresses among a plurality of data transmission units on a network, said plurality of data transmission units being under control of link state routing, said automatic network-address-duplication detection method comprising-the steps of:

(a) on one data transmission unit, transmitting a network-wide distribution packet, said transmission comprising the steps of:
  (i) obtaining an MAC address;
  (ii) adding the obtained MAC address to the link state packet;
  (iii) obtaining a system identification from an NSAP address of the one data transmission unit and setting the obtained system identification in the link state packet; and
  (iv) transmitting the link state packet to the network; and (b) on another data transmission unit, checking the network-wide distribution packet, said checking step comprising the steps of:
  (i) receiving the link state packet;
  (ii) extracting the system identification of the sending data transmission unit from the received packet;
  (iii) selecting a method for detecting an address duplication depending upon-whether or not the received link state packet contains the MAC address;
  (iv) searching an NSAP-MAC address table for the system identification of the sending data transmission unit, said NSAP-MAC address table containing a plurality of pairs of the system identification and the address; and
  (v) determining whether or not there is an address duplication depending upon whether the NSAP-MAC address contains the system identification of the sending data transmission unit and upon the MAC address corresponding to the system identification.

11. The automatic network-address-duplication detection method according to claim 10, further comprising the step of:
if the received link state packet does not contain the MAC address and if the NSAP-MAC address table does not contain the system identification of the sending data transmission unit, adding the system identification and an unknown address indicator to the NSAP-MAC address table.

12. The automatic network-address-duplication detection method according to claim 10, further comprising the step of:
if the received link state packet does not contain the MAC address and if the NSAP-MAC address table contains the system identification of the sending data transmission unit, checking if the NSAP-MAC address table contains the MAC address corresponding to the system identification and, if the NSAP-MAC address table does not contain the MAC address corresponding to the system identification, determining that there is no address duplication.

13. The automatic network-address-duplication detection method according to claim 10, further comprising the step of:
if the received link state packet does not contain the MAC address and if the NSAP-MAC address table contains the system identification of the sending data transmission unit, checking if the NSAP-MAC address table contains the MAC address corresponding to the system identification and, if the NSAP-MAC address table contains the MAC address corresponding to the system identification, determining that there is an address duplication, displaying an address duplication message, and deleting only the MAC address from the NSAP-MAC address table.

14. The automatic network-address-duplication detection method according to claim 10, further comprising the step of:
if the received link state packet contains the MAC address and if the NSAP-MAC address table does not contain the system identification of the sending data transmission unit, adding the system identification and the MAC address to the NSAP-MAC address table.

15. The automatic network-address-duplication detection method according to claim 10, further comprising the step of:
if the received link state packet contains the MAC address and if the NSAP-MAC address table contains the system identification of the sending data transmission unit, checking if the NSAP-MAC address table contains the MAC address corresponding to the system identification and, if the NSAP-MAC address table does not contain the MAC address corresponding to the system identification, determining that there is an address duplication, displaying an address duplication message, and updating the NSAP-MAC address table with the MAC address obtained from the link state packet.

16. The automatic network-address-duplication detection method according to claim 10, further comprising the step of:
if the received link state packet contains the MAC address and if the NSAP-MAC address table contains the system identification of the sending data transmission unit, checking if the NSAP-MAC address table contains the MAC address corresponding to the system identification and, if the NSAP-MAC address table contains the MAC address corresponding to the system identification, comparing the MAC address obtained from the link state packet with the MAC address contained in the NSAP-MAC address table and, if the MAC address obtained from the link state packet does not match the MAC address contained in the NSAP-MAC address table, determining that there is an address duplication, displaying an address duplication message, and updating the NSAP-MAC address table with the MAC address obtained from the link state packet.

17. The automatic network-address-duplication detection method according to claim 10, further comprising the step of:
if the received link state packet contains the MAC address and if the NSAP-MAC address table contains the system identification of the sending data transmission unit, checking if the NSAP-MAC address table contains the MAC address corresponding to the system identification and, if the NSAP-MAC address table contains the MAC address corresponding to the system identification, comparing the MAC address obtained from the link state packet with the MAC address contained in the NSAP-MAC address table and, if the MAC address obtained from the link state packet matches the MAC address contained in the NSAP-MAC address table, determining that there is no address duplication.

18. An automatic network-address-duplication detection device for detecting duplicated addresses among a plurality of data transmission units connected to a local area network or a point-to-point line, said plurality of data transmission units being under control of link state routing, said automatic network-address-duplication device comprising a link state packet database containing link state packets used in link state routing, a MAC address which is uniquely assigned, an NSAP-MAC address table containing NSAP address to MAC address correspondence information, a network layer controller, and a processor, wherein said processor causes said network-address-duplication detection device to:

(a) on one data transmission unit, transmit a network-wide distribution packet, wherein said one data transmission unit:
  (i) obtains the MAC address;
  (ii) adds the obtained MAC address to the link state packet;
  (iii) obtains a system identification from the NSAP address of the one data transmission unit and sets the obtained system identification in the link state packet; and
  (iv) transmits the link state packet to the network; and (b) on another data transmission unit, check the network-wide distribution packet, wherein said another data transmission unit:
  (i) receives the link state packet;
  (ii) extracts the system identification of the sending data transmission unit from the received packet;
  (iii) checks if the received link state packet contains the MAC address;
  (iv) checks if the NSAP-MAC address table address table contains the system identification of the sending data transmission unit;
  (v) if the received link state packet does not contain the MAC address and if the NSAP-MAC address table does not contain the system identification of the sending data transmission unit, adds the system identification and an unknown address indicator to the NSAP-MAC address table;
  (vi) if the received link state packet does not contain the MAC address and if the NSAP-MAC address table contains the system identification of the sending data transmission unit, checks if the NSAP-MAC address table contains the MAC address corresponding to the system identification and, if the NSAP-MAC address table does not contain the MAC address corresponding to the system identification, determines that there is no address duplication;
  (vii) if the received link state packet does not contain the MAC address and if the NSAP-MAC address table contains the system identification of the sending data transmission unit, checks if the NSAP-MAC address table contains the MAC address corresponding to the system identification and, if the NSAP-MAC address table contains the MAC address corresponding to the system identification, determines that there is an address duplication, displays an address duplication message, and deletes only the MAC address from the NSAP-MAC address table;
  (viii) if the received link state packet contains the MAC address and if the NSAP-MAC address table does not contain the system identification of the sending data transmission unit, adds the system identification and the MAC address to the NSAP-MAC address table;
  (ix) if the received link state packet contains the MAC address and if the NSAP-MAC address table contains the system identification of the sending data transmission unit, checks if the NSAP-MAC address table contains the MAC address corresponding to the system identification and, if the NSAP-MAC address table does not contain the MAC address corresponding to the system identification, determines that there is an address duplication, displays the address duplication message, and updates the NSAP-MAC address table with the MAC address obtained from the link state packet;
  (X) if the received link state packet contains the MAC address and if the NSAP-MAC address table contains the system identification of the sending data transmission unit, checks if the NSAP-MAC address table contains the MAC address corresponding to the system identification and, if the NSAP-MAC address table contains the MAC address corresponding to the system identification, compares the MAC address obtained from the link state packet with the MAC address contained in the NSAP-MAC address table and, if the MAC address obtained from the link state packet does not match the MAC address contained in the NSAP-MAC address table, determines that there is an address duplication, displays the address duplication message, and updates the NSAP-MAC address table with the MAC address obtained from the link state packet;
  (xi) if the received link state packet contains the MAC address and if the NSAP-MAC address table contains the system identification of the sending data transmission unit, checks if the NSAP-MAC address table contains the MAC address corresponding to the system identification and, if the NSAP-MAC address table contains the MAC address corresponding to the system identification, compares the MAC address obtained from the link state packet with the MAC address contained in the NSAP-MAC address table and, if the MAC address obtained from the link state packet matches the MAC address contained in the NSAP-MAC address table, determines that there is no address duplication.

19. The automatic network-address-duplication detection device according to claim 18, wherein the data transmission unit is connected to a wide area network.

20. The automatic network-address-duplication detection device according to claim 18, wherein the NSAP-MAC address table contains only the MAC address obtained from each link state packet, wherein the link state packet of each data transmission unit points to said MAC address, said link state packet being stored in the link state packet database, and wherein, when searching for the MAC address corresponding to the system identification, the device searches the link state packet database instead of the NSAP-MAC address table.

21. An automatic network-address-duplication detection device for detecting duplicated addresses among a plurality of data transmission units on a network, said plurality of data transmission units being under control of link state routing, said automatic network-address-duplication detection device comprising:

a link state packet database containing link state packets used in link state routing;

a MAC address which is uniquely assigned;

an NSAP-MAC address table containing NSAP address to MAC address correspondence information; and a network layer control means, wherein said network layer control means comprising:

message display means for displaying an address duplication message;
link state packet reception control means;
MAC address acquisition means for acquiring the MAC address assigned to the data transmission unit;
link state packet assembly means for adding the MAC address to the link state packet and adding a system identification from the NSAP address to the link state packet;
link state packet sending means for sending the link state packet generated by the link state packet assembly means to the network;
received message distribution means for sending the received link state packet to the address duplication checking means;
address duplication checking means;
address comparison means for comparing the MAC address stored in the NSAP-MAC address table with the link state packet stored in the MAC address;
address search means for searching the NSAP-MAC address table for the system identification;
address table updating means for updating the NSAP-MAC address table;
message transfer control means, and NSAP address.

22. A computer program product stored on a storage medium for controlling an automatic network-address-duplication detection device for detecting duplicated addresses among a plurality of data transmission units on a network, said plurality of data transmission units being under control of link state routing, wherein the program causes said automatic network-address-duplication detection device to:

(a) transmit a network-wide distribution packet on one data transmission unit, wherein said processor causes said one data transmission unit to:
  (i) obtains the MAC address;
  (ii) adds the obtained MAC address to the link state packet;
  (iii) obtains a system identification from the NSAP address of the one data transmission unit and sets the obtained system identification in the link state packet; and
  (iv) transmits the link state packet to the network; and
(b) check the network-wide distribution packet on another data transmission unit, wherein said processor causes said another data transmission unit to:
  (i) receives the link state packet;
  (ii) extracts the system identification of the sending data transmission unit from the received packet;
  (iii) selects a method for detecting an address duplication depending upon whether or not the received link state packet contains the MAC address;
  (iv) searches the NSAP-MAC address table for the system identification of the sending data transmission unit; and
  (v) determines whether or not there is an address duplication depending upon whether the NSAP-MAC address table contains the system identification of the sending data transmission unit and upon the MAC address corresponding to the system identification.

* * * * *